United States Patent [19]

Ogiso

[11] Patent Number: 4,802,104

[45] Date of Patent: Jan. 31, 1989

[54] DUAL SCREEN DOCUMENT PROCESSING SYSTEM

[75] Inventor: Masao Ogiso, Yokohama, Japan

[73] Assignee: Canon Kabushiki Kaisha, Tokyo, Japan

[21] Appl. No.: 863,834

[22] Filed: May 16, 1986

[30] Foreign Application Priority Data

May 31, 1985 [JP] Japan .................. 60-116721

[51] Int. Cl.⁴ ............................................. G06F 15/66
[52] U.S. Cl. ..................................... 364/518; 364/200; 340/721; 340/745; 340/723; 340/734
[58] Field of Search ............... 364/200 MS File, 518, 364/523, 900 MS File; 358/280; 340/721, 745, 747, 799, 723, 724, 734, 750

[56] References Cited

U.S. PATENT DOCUMENTS

| | | | |
|---|---|---|---|
| 4,193,119 | 3/1980 | Arase et al. | 364/900 |
| 4,451,900 | 5/1984 | Mayer et al. | 364/900 |
| 4,484,302 | 11/1980 | Cason et al. | 364/900 |
| 4,667,248 | 5/1987 | Kanno | 358/280 |
| 4,686,649 | 8/1987 | Rush et al. | 364/900 |

FOREIGN PATENT DOCUMENTS 2137788 of 0000 United Kingdom .

Primary Examiner—Gary V. Harkcom
Assistant Examiner—Randy W. Lacasse
Attorney, Agent, or Firm—Fitzpatrick, Cella, Harper & Scinto

[57] ABSTRACT

A document processing system includes a display unit having a first display for displaying document information and a second display for displaying layout information representative of the output form of the document information displayed on the first display; a storage unit for storing the document information; an indication unit for indicating performance of an edition of the displayed layout information by directly processing the second display; and an edition unit for editing the layout information at the second display end based on the indication by the indication unit.

10 Claims, 3 Drawing Sheets

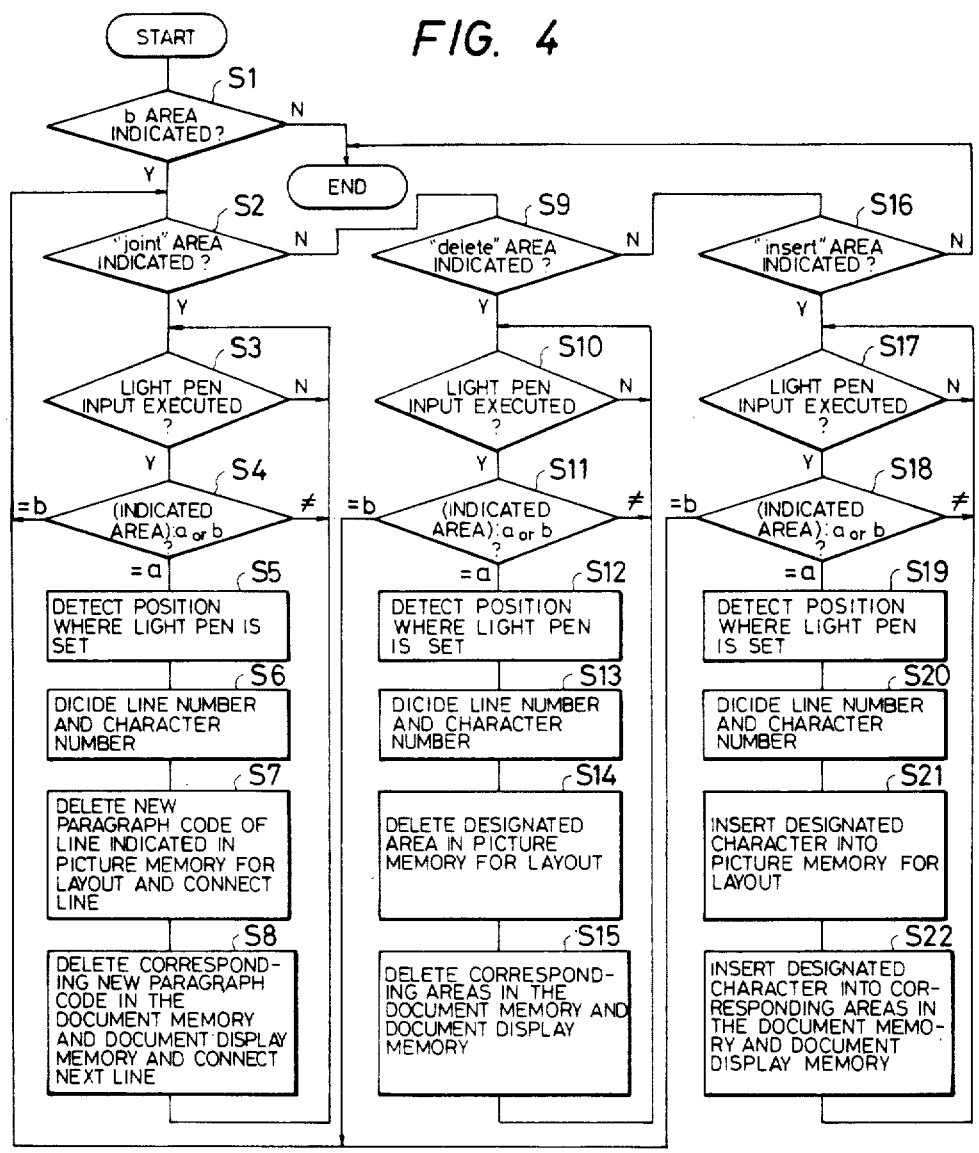

DUAL SCREEN DOCUMENT PROCESSING SYSTEM

BACKGROUND OF THE INVENTION

1. Field of the Invention

The present invention relates to document processing and more particularly, to a document processing system capable of changing the layout of a document by directly processing the displayed layout.

2. Related Background Art

Generally speaking, a change in an inputted document, e.g., an insertion of an additional area in the inputted document, need not alter the content of the inputted document. Instead, in most cases, such change can be made merely by changing the layout of the inputted document. It is necessary, however, to change the layout by inputting proper keys, such as space keys, in the same mode as in a usual document input. Further, in this document input mode, it is common that the entire document is not displayed on a screen, resulting in difficulty in the input operation and perhaps in an erroneous operation, such as inadvertent change or erasure of the inputted document. In UK Patent Application No. (GB 2137788A) there is disclosed a display system capable of displaying and laying out stored document information. The above-mentioned problems are not solved however in this disclosure.

SUMMARY OF THE INVENTION

It is an object of the present invention to eliminate the above-described disadvantages of the prior art and provide a document processing system capable of changing a layout by directly processing the displayed layout.

It is another object of the present invention to provide a document processing system capable of easily changing the content of a document memory by changing the layout of a document.

It is a further object of the present invention to provide a document processing system capable of editing layout information on a second display by directly acting upon the second display based on an indication from indication means.

It is a still further object of the present invention to provide a document processing system capable of editing document information stored in storage means based on an indication from indication means.

It is another object of the present invention to provide a document processing system capable of editing document information displayed on a first display based on an indication from indication means.

It is a further object of the present invention to provide a document processing system capable of printing out document information after editing.

BRIEF DESCRIPTION OF THE DRAWINGS

FIG. 4 is a flow chart showing an example of the layout changing processes.

DETAILED DESCRIPTION OF THE PREFERRED EMBODIMENT

The preferred embodiment will now be described in detail with reference to the accompanying drawings.

The term "document" used throughout the specification includes all of characters, devices, symbols, images and so on. Thus, the document may be constructed of only characters, any of characters, devices, graphs, images and so on, a combination thereof, or only images. [Description of the System Outline (FIG. 1)]

Figure 1:
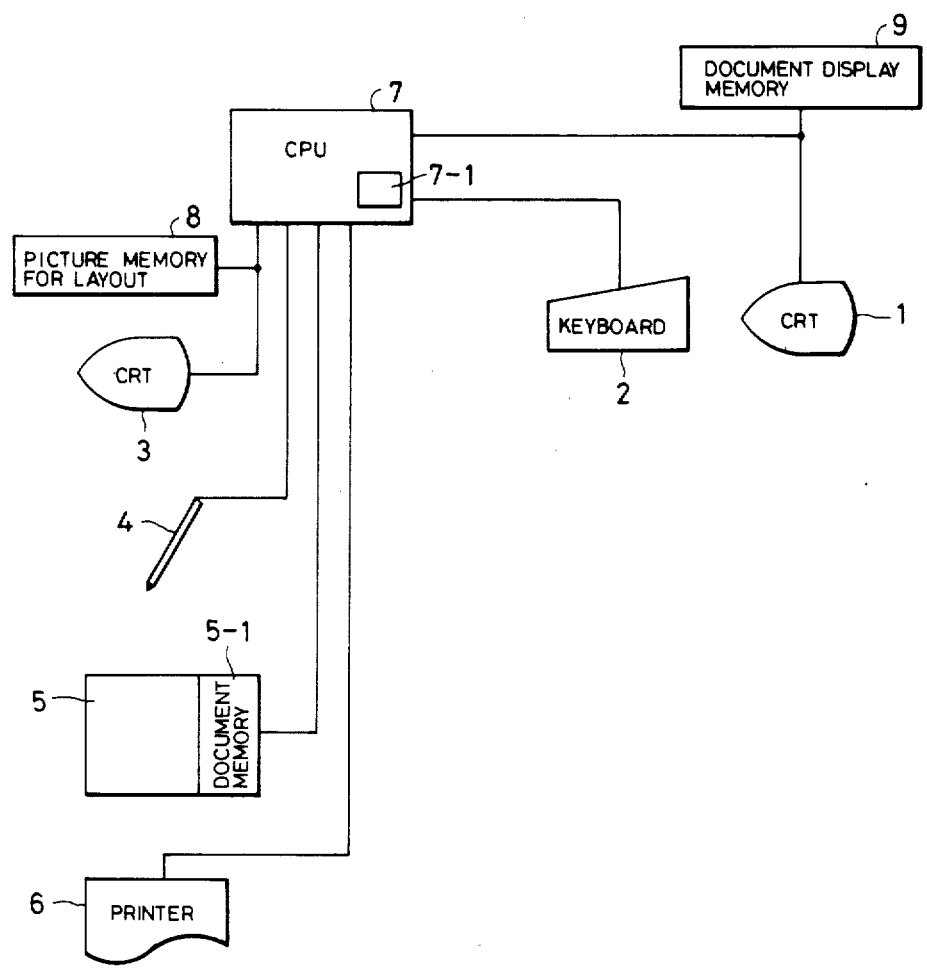
FIG. 1 schematically shows the outline of the document processing system according to an embodiment of the present invention.

FIG. 1 shows the overall construction of the document processing system according to the preferred embodiment of the present invention. A CRT 1 displays inputted characters, document data and the like. A keyboard 2 is for inputting character information and various functions. A CRT 3 displays the layout of an inputted document. A light pen 4 can indicate any desired position on the layout display CRT 3. A memory 5 includes a document memory 5-1 for storing document information inputted from the keyboard 2 and stores various information necessary for producing document information.

A printer 6 prints a produced document, and a CPU 7 for controlling the whole system includes a memory 7-1 storing control programs shown in FIG. 4. A picture memory 8 for layout is used for displaying a layout on the CRT 3, while a document display memory 9 is used for displaying document data on the CRT 1. When document information is inputted from the keyboard 2, the CPU 7 stores the inputted document information in the memory 5 and displays it on the CRT 1. The layout of the whole document stored in the memory 5 is displayed on the CRT 3 by displaying characters with "." for example. [Example of Layout Change (FIGS. 2, 3 and 4)]

Figure 2:
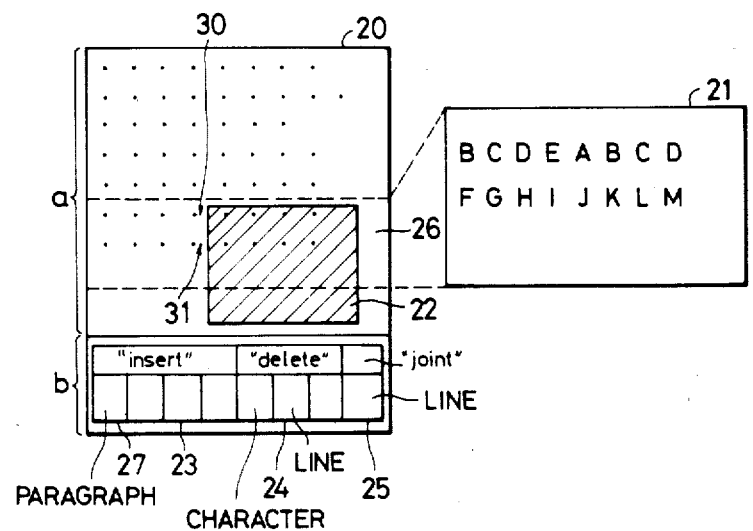
FIG. 2 shows a correspondence between a layout display image prior to changing the layout and a document data display image.
Figure 3:
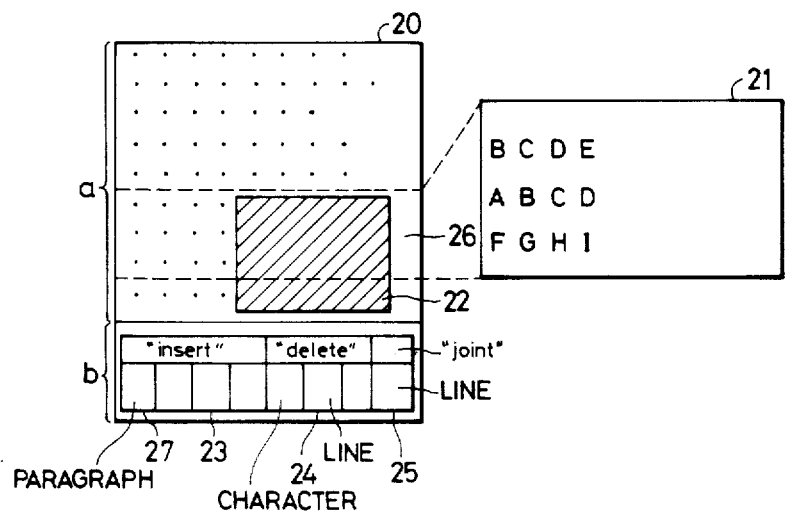
FIG. 3 shows a correspondence between the layout display image after changing the layout and the document data display image.

FIGS. 2 and 3 show layout images 20 on the CRT 3 and document data images 21 on the CRT 1, wherein an area 22 indicated by oblique lines in the layout image of FIG. 2 is inserted to obtain a layout shown in FIG. 3. The layout images 20 each cover the entirely of a one page document, while the document data images 21 each show the respective portion 26 of the one page document on the CRT 1.

The area a on the layout image 20 is a layout area for document data, and the area b is an area for designating a function, such as "insert", "delete", "joint" or the like. When any one of the areas on the layout image 20 on the CRT 3 is indicated by the light pen 4, the light pen 4 detects a light of the scan line scanning the screen of the CRT 3 and informs the CPU 7 of its detection. Therefore, the position on the layout image on the CRT 3 indicated by the light pen 4 can be read (e.g., by indicating two points, a rectangular area 22 as shown in FIG. 2 can be determined) and the corresponding processings can be executed.

The procedures of inserting the area 22 indicated by the oblique lines into the layout image 20 of FIG. 2 and changing the layout to that shown in FIG. 3, will be described with reference to the flow chart of FIG. 4.

In the flow chart of FIG. 4, the procedure starts upon input of the light pen 4. First, at step S1 it is checked if the area b shown in FIGS. 2 and 3 is indicated or not. If not, the procedure terminates. If affirmative, step S2 follows to check if the "joint" area 25 is indicated. If affirmative, step S3 follows to wait for a next input from the light pen 4.

Upon input from the light pen 4, step S4 follows to check if the inputted area is the area a or b. If the area b is indicated, step S2 resumes to check which portion within the area b is indicated. If the indicated area is neither the area a nor b, than step S3 resumes to wait for a next input from the light pen 4. If the area a is indicated at step S4, then step S5 follows to detect the position where the light pen 4 is set. Thereafter at step S6 the line number and character number indicated by the light pen 4 are decided.

Then, at step S7 the new paragraph code of the indicated line in the picture memory 8 for layout is deleted. Data of the next line accordingly follows immediately after data of the indicated line to connect two lines. Thereafter, at step S8 the corresponding line in the document memory 5-1 is subjected to the similar processings. In this case, by changing the corresponding content of the document display memory 9, the above layout change can be confirmed by the displayed document image on the CRT 1.

If the indicated area at step S2 is not the "joint" area 25, then step S9 follows to check if the "delete" area 24 is indicated. If affirmative, step S10 follows to check if there is an input from the light pen 4. Upon input from the light pen 4, step S11 follows to identify an indicated area. Similarly to the case described with respect to step S4, step S2 resumes in case where the indicated area is the area b, or step S10 resumes in case where the indicated area is neither the area a and b.

If the indicated area is the area a, then step S12 follows to detect the position where the light pen 4 is set and decide (at step S13) the indicated line number and character number. At step S14 the corresponding line or character in the picture memory 8 for layout is deleted. At step S15 the corresponding areas in the document memory 5-1 and the document display memory 9 are deleted to complete the deletion processing for a document.

If the "delete" area 24 is not indicated at step S9, then step S16 follows to check if the "insert" area 23 is indicated. If affirmative, then step S17 follows to check for an input from the light pen 4. Upon input from the light pen 4, step S18 follows to further advance to step S19 in case where the area a is indicated at step S18.

In case that, after the paragraph area 27 of the "insert" area 23 of FIG. 23 is indicated and the point 30 in the area a is indicated by the light pen 4, then at steps S19 and S20 the line number (sixth line) of the current page and its character position (fourth character) are determined. Thereafter, at step S21 the paragraph code is inserted in the corresponding area of the picture memory 8 for layout.

Next, at step S22 the paragraph code is inserted in the corresponding area of the document memory 5-1. When the point 31 is indicated again by the light pen 4, steps S17 to S22 are executed similarly to the above to obtain layout and document data shown in FIG. 3. In addition, the content of the document display memory 9 is altered to change the display on the CRT 1.

As seen from the foregoing description of the preferred embodiment, the layout of a document is changed by processing the displayed layout image 20 so that changing the layout can be easily made with less chance of erroneous operation.

In the above embodiment, although three types of layout change, i.e., "insert", "delete" and "joint" are described, the present invention is not limited thereto. Further, although the CRTs for displaying layout and document data are provided separately, the present invention is not limited thereto but only one CRT may be used for displaying both layout and document data simultaneously or by overlapping them. Or other displays such as liquid crystal devices may be used.

The layout changing procedure is executed based on an indication by the light pen. However, the invention is not limited thereto but a cursor key on a keyboard, joy stick, digitizer or the like may also be used.

As described so far, according to the present invention, the layout of a document can be changed directly through the displayed layout image. Therefore, the layout changing operation is simple because the layout of a whole document can be recognized at a glance. Further, since the display of document information is also changed in accordance with the layout change, chance of an erroneous operation can be minimized.

What is claimed is:

1. A document processing system comprising:
    display means including a first display for displaying document information and a second display for displaying layout information representative of the form of output of said document information displayed on said first display and for displaying a plurality of commands for editing said layout information;
    storage means for storing said document information;
    indication means for selecting one of said plurality of commands displayed by said second display and for indicating that said layout information displayed by said second display has been edited in accordance with said selected command; and
    edition means for editing said layout information displayed by said second display in accordance with the one of said plurality of commands selected by said indication means.

2. A document processing system according to claim 1, wherein the displayed images of said first and second displays are formed on desired areas of a single screen.

3. A document processing system according to claim 1, wherein said plurality of commands in accordance with which said edition means edits said layout information includes at least one of insertion, deletion and joint functions.

4. A document processing system according to claim 1, wherein the amount of said document information displayed on said first display is smaller than the amount of the document portion of said layout information displayed on said second display.

5. A document processing system according to claim 1, wherein said layout information is represented by a different image from that of said document information.

6. A document processing system comprising:
    display means including a first display for displaying document information, and a second display for displaying layout information representative of the form of output of said document information displayed on said first display and for displaying a plurality of commands for editing said layout information;
    storage means for storing said document information;
    indication means for selecting one of said plurality of commands displayed by said second display and for indicating that said layout information displayed by said second display has been edited in accordance with said selected command;
    edition means for editing said layout information displayed by said second display in accordance with the one of said plurality of commands selected by said indication means and further for editing said document information stored in said storage means so as to edit said document information displayed by said first display; and printing means for printing out document information which has been edited by said edition means and stored in said storage means.

7. A document processing system according to claim 6, wherein the displayed images of said first and second displays are formed on desired areas of a single screen.

8. A document processing system according to claim 6, wherein said plurality of commands in accordance with which said edition means edits said layout information includes at least one insertion, deletion and joint functions.

9. A document processing system according to claim 6, wherein the amount of said document information displayed on said first display is smaller than the amount of the document portion of said layout information displayed on said second display.

10. A document processing system according to claim 6, wherein said layout information is represented by a different image from that of said document information.

* * * * *

UNITED STATES PATENT AND TRADEMARK OFFICE
CERTIFICATE OF CORRECTION

PATENT NO. : 4,802,104
DATED : January 31, 1989
INVENTOR(S) : MASAO OGISO

It is certified that error appears in the above-identified patent and that said Letters Patent is hereby corrected as shown below:

Title page:

IN [56] REFERENCES CITED

FOREIGN PATENT DOCUMENTS, "2137788 of 0000" should read --2137788A 10/84--.

SHEET 3

FIG. 4, "DICIDE" should read --DECIDE-- (all occurrences).

COLUMN 2 Line 11, [Description of the System Outline (Fig. 1)]" should be a heading.
Lines 36-37, "[Example of Layout Change (FIGS. 2, 3)] should be a heading.
Line 58, Insert as a heading --[Layout Changing Processes (FIGS. 2, 3 and 4)]--.

COLUMN 6

Line 2, "one" should read --one of --.

Signed and Sealed this

Twenty-sixth Day of June, 1990

*Attest:*

HARRY F. MANBECK, JR.

*Attesting Officer*        *Commissioner of Patents and Trademarks*